UNITED STATES PATENT OFFICE.

WILLIAM R. BAKER, OF PASADENA, CALIFORNIA.

PRESERVING FRUIT.

SPECIFICATION forming part of Letters Patent No. 401,109, dated April 9, 1889.

Application filed July 28, 1888. Serial No. 281,305. (Specimens.)

*To all whom it may concern:*

Be it known that I, WILLIAM R. BAKER, a citizen of the United States, residing at Pasadena, in the county of Los Angeles and State of California, have invented a new and useful Improvement in the Process for Curing or Drying Fruit, of which the following is a specification.

My invention relates to a process for curing or drying fruit, which is hereinafter fully described, and specifically pointed out in the appended claim.

Heretofore it has been the practice in curing fruit to subject the same when about half ripe to the heat of the sun or a drying-room, for the reason that if the fruit is allowed to attain full perfection the action of the heat will cause fermentation and it would ultimately rot, and therefore it is necessary to take the fruit before it has received its full amount of sugar. Obviously a large amount of flavor, sweetness, and weight are lost in this way, and the fruit resulting from the process is comparatively tasteless.

In my improved process I allow the fruit to attain perfection. In fact, even windfalls and partially-bruised fruit may be used, and therefore the dried fruit contains all the flavor and sweetness of the original and no weight except that of water is lost.

The object of this invention is therefore to provide a treatment for the fruit before subjecting it to the heat, which will preserve it and prevent fermentation, and this object is attained in the hereinafter-described process, which consists, essentially, in first subjecting the fruit to the fumes of a preservative compound in a confined space.

The said compound consists of sulphur, nine pounds; willow charcoal, one-fourth pound; saltpeter, one-fourth pound; allspice, three ounces; coffee, (ground,) one-fourth pound; alum, one-ounce. These ingredients are thoroughly mixed, and after the fruit to be cured has been arranged in a suitable confined space, as a box or room, the mixture is lighted and placed in the said space, and the fumes are allowed to envelop the fruit for a short time—say two hours. After this treatment the fruit is removed from the box or room and exposed to the open air, preferably in such a position that the rays of the sun may strike it until dried. The subjection of the fruit to the above-mentioned preservative compound causes its surface to be partially dried, thereby producing a crust which is sufficient to resist the attack of insects and prevent them from penetrating. This crust also protects the fruit against moisture in the air during the drying process.

The advantages of this process of curing fruit will readily be appreciated without further enlarging on the same herein.

The functions of the ingredients of the compound are as follows: The sulphur is designed to bleach the fruit, the alum, charcoal, and saltpeter act as the preservatives, while the fumes of the coffee and allspice overcome the taste which might be given the fruit by the sulphur.

Having thus described my invention, I claim—

The process of curing or drying fruit, consisting in first subjecting it in a confined space to the fumes of the herein-described mixture, composed of sulphur, willow charcoal, saltpeter, allspice, coffee and alum, and then exposing the same to the action of a drying agent, substantially as specified.

In testimony that I claim the foregoing as my own I have hereto affixed my signature in presence of two witnesses.

W. R. BAKER.

Witnesses:
    BAYARD T. SMITH,
    GEO. HERRMANN.